United States Patent Office 2,701,255
Patented Feb. 1, 1955

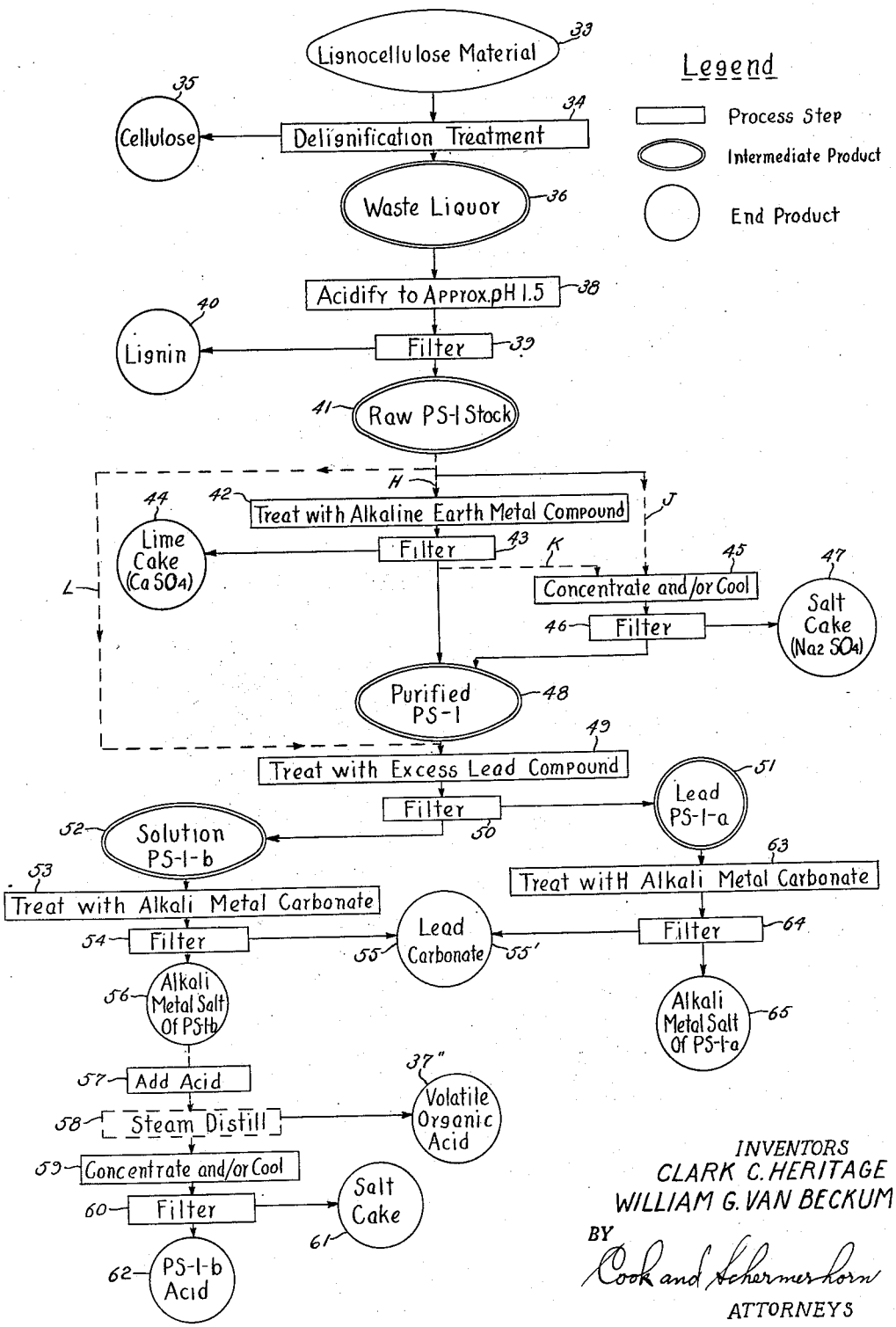

2,701,255

ORGANIC PRODUCTS FROM LIGNOCELLULOSE

Clark C. Heritage, Cloquet, Minn., and William G. Van Beckum, Longview, Wash., assignors to Weyerhaeuser Timber Company, Longview, Wash., a corporation of Washington Application July 29, 1949, Serial No. 107,636

16 Claims. (Cl. 260—435)

This invention relates to certain novel chemical products other than cellulose and lignin obtained from lignocellulose raw materials and to the process for their production. The invention is particularly concerned with the treatment of the waste liquors from pulp-producing processes or from lignin recovery processes for the recovery from such liquors of their content of organic materials other than cellulose or lignin, although in the practice of the process on solutions from which the lignin content has not been removed, a lignin material is also recovered as a preliminary product.

It is well known that trees and other lignocellulosic materials such as wood, corn stalks, corn cobs, straw, bagasse, flax shives, hemp, nut shells, etc. are composed of a great number of diverse chemical substances of both simple and complex structure, many of which substances are at present of unknown constitution. It is apparent that the identification and isolation of these substances are of considerable importance in the development of new and useful products of commerce. It is of particular economic consequence to those industries which are concerned with the processing of woods, for example, in the manufacture of lumber and diverse fibrous products, that practicable methods be found for the commercial production of these substances.

It is the discovery of this invention that the solutions resulting from processes wherein the cellulosic constituent of lignocellulosic material has been removed or the solutions resulting from the treatment of lignocellulose materials wherein both the cellulosic and lignin content have been removed, can be treated in a novel manner to recover as a new and useful product, organic materials other than cellulose or lignin, originally present in the lignocellulose material, which product is herein arbitrarily designated as PS–1, and that the said product can be further treated to divide same into two separate products of different chemical characteristics, herein arbitrarily designated as PS–1–a and PS–1–b.

The said organic materials, designated PS–1, are sometimes loosely and generically referred to in the art under the general heading of pentosans or polysaccharides-other-than-cellulose but it will be appreciated from the teachings of this invention that these organic materials include chemical compounds which are not pentosans nor polysaccharides, at least when produced in accordance with this invention. A more exact definition of these materials is: "Organic chemicals having their origin in the extractives of the original wood and containing a substantial percentage of polysaccharides."

Broadly stated, the process of the invention comprises removing lignin, in those applications where the lignin has not already been removed, from the solution remaining after the delignification treatment of lignocellulose material, treating the solution to remove the anion of the acid or inorganic salts employed in precipitating the lignin and to remove any other inorganic foreign matter which would form an insoluble salt of lead, and then supplying lead ions to the solution which are effective to precipitate as one product, designated PS–1–a, one chemically similar group of the said other organic materials. The remainder of the said organic materials are recovered as a second product designated PS–1–b, by removal of the lead ion from solution and evaporation. Volatile organic acids usually found in wood substance, such as acetic and formic, may be recovered at any stage in the process by steam distillation, if they have not been sooner removed, or they may be allowed to remain with the solution to the end of the process in order to participate as a reactant in certain process steps as herein described.

It is a principal object of the present invention to provide a commercially feasible process for the production from lignocellulose materials of organic materials other than cellulose and lignin which were originally present in the lignocellulose materials.

It is an object of the invention to provide a method for the treatment of those solutions resulting from the treatment of lignocellulose material by which the cellulosic constituent has been removed therefrom, for removal of the lignin content and to thereafter separate from such solutions organic materials other than cellulose and lignin, including polysaccharide acids.

It is another object of the invention to treat the solution resulting from the treatment of lignocellulose materials by which the cellulosic and lignin constituents have been removed therefrom, to obtain from said resulting solution a novel phenolic product which is arbitrarily herein designated as PS–1–a.

It is another object to treat the said resulting solution so as to produce a novel product comprised predominantly of a mixture of salts of formic, acetic and hydroxyl acids ranging in size from glycolic to low molecular weight polysaccharide acids, sometimes referred to as polysaccharides-other-than cellulose, and herein arbitrarily designated as PS–1–b.

Still another object of this invention is to provide a process for the isolation from lignocellulose material from which the cellulosic and lignin content had been removed, of the aforesaid novel phenolic product and to leave the remainder of the lignocellulose substance as a product consisting of a mixture of salts of formic, acetic and hydroxyl acids ranging in size from glycolic to low molecular weight polysaccharide acids.

It is a particular object of this invention to provide a process for the treatment of the solution obtained by the treatment of lignocellulose material originally containing cellulose, lignin, and other organic materials which has been treated so as to remove the cellulose and lignin, and which other organic materials include acetic or other naturally occurring acid still in solution, whereby said naturally occurring acid may be utilized as a continuously regenerative reactant in one step of the process for the production of the abovesaid phenolic product.

Other objects and advantages of the present invention will become apparent from the following description and explanation in connection with the appended drawing wherein process steps are shown in rectangular blocks, materials in process are shown in double-curved line inclosures, and end products are shown in single ring circles. Precipitates are shown in circles disposed laterally of the filter step by which they are separated and solutions resulting from filtration steps are shown in elliptical inclosures except when they may be regarded as end products. Alternative sequences and steps are indicated by broken lines.

The single figure is a flow chart diagrammatically representing a preferred embodiment of the process for obtaining a substantially pure PS–1 product and separating the same into the separate products PS–1–a and PS–1–b.

While the process of the invention is applicable to the waste liquors obtained from any delignification treatment of lignocellulose material wherein either the cellulose, or both the cellulose and lignin, have previously been removed as a part of the delignification treatment, the invention will be described and illustrated herein with reference to the waste liquors obtained from the caustic treatment of lignocellulose material which involves the production of a cellulose fiber product, and the treatment of the resulting solution for the precipitation therefrom of the lignin content. A preferred type of caustic treating process is disclosed and described in the copending applications of Clark C. Heritage and William G. Van Beckum, entitled Process for Producing Lignin Products, Serial No. 33,638, filed June 17, 1948, now Letters Patent No. 2,541,127, issued on February 13, 1951; Legnin Products, Serial No. 711,790, filed November 22, 1946, abandoned and re-filed November 18, 1950, as Serial No. 196,443; and Processing of Lignocellulose Material, Serial No. 33,278, filed June 16, 1948, now Letters Patent No. 2,541,058, issued on February 13, 1951.

In accordance with the processes disclosed in the aforementioned applications, lignocellulose material 33, referring to the drawing, is treated with an alkali reacting compound of an alkali metal, preferably caustic soda, at step 34, to produce a cellulose fiber product 35 and a solution 36, which in some cellulose treating processes is denominated a waste liquor. The solution 36, containing the dissolved lignin, is then acidified to a pH of approximately 1.5 at step 38, causing the lignin content to precipitate, which is filtered at step 39 and recovered as lignin product 40, leaving as the filtrate a solution 41 containing the raw PS-1 stock of this invention. Sulfuric acid is a preferred reagent for use in step 38, although other acids and acid materials capable of providing a pH value of 1.5 may be used, such as sodium acid sulphate. It may be advisable in order to effect complete precipitation of the lignin content to condition the solution by the removal of water of solution until the inorganic salt content is brought almost to saturation, or to increase the relative inorganic salt content almost to the saturation point by the direct addition of salt. These and other precedures for facilitating the precipitation of lignin are more fully disclosed and described in the above said copending application Serial No. 33,278.

If the lignin, as well as the cellulose has been removed, the starting point of the process of the present invention may be regarded as the raw PS-1 stock solution 41, which is a dark-colored, thin, aqueous solution. If the process of the invention is to be applied to a waste liquor from which the lignin has not previously been removed, the above described treatment or other suitable method for removing the lignin should be employed.

One method of removing lignin is to precipitate the same by means of metals other than the alkali metals, such as is described and disclosed in copending application entitled Process for Metal Recovery, Serial No. 714,900, filed December 7, 1946 now U. S. Patent 2,589,252, issued March 18, 1952. The use of lead as the precipitating metal, however, should be avoided because it would also cause the precipitation of the phenolic product PS-1-$a$, unless, of course, it is desired to produce a composite consisting of both the lignin content and the phenolic product PS-1-$a$. The metal variation of the process using lead intentionally as the precipitating metal might also be desired where a primary objective is to obtain the PS-1-$b$ product as quickly and economically as possible. It will be more apparent from the description hereinafter of the lead precipitating technique as to how this variation of the process may be practiced, when so desired.

Various modifications, alternative steps, and expediting procedures may be employed in the practice of the invention with respect to the purification of product PS-1 and the separation of that product into products PS-1-$a$ and PS-1-$b$. Solution 41 may be treated in accordance with the process of this invention, either to obtain the organic materials contained therein as a substantially pure composite product, PS-1, or the process may be carried further for the separation of the said organic materials into the two component products, one PS-1-$a$ composed primarily of a non-ligneous, phenolic material and the other, PS-1-$b$, consisting of a mixture of salts of formic, acetic and hydroxyl acids ranging in size from glycolic to low molecular weight polysaccharide acids.

Two main considerations are involved: first, the purification of the PS-1 product by removing the inorganic salt content, and, second, the selection of reagents so as to avoid unnecessarily introducing contaminating materials into the solution. Separation of PS-1 into the two components is effected by utilizing the property discovered to be possessed by the phenolic product, PS-1-$a$, of forming an insoluble salt with lead. Incidentally, lead is the only metal known to form an insoluble salt with this product. It is therefore desired to keep the solution as free as possible of other anions which form insoluble salts with lead, such as the sulfates, which would otherwise precipitate with the lead PS-1-$a$.

The lead PS-1-$a$ salt precipitates either from acid or neutral solutions, which fact lends itself to the employment of two different techniques at the beginning of the process, to wit: The solution may be neutralized, in which case a soluble salt of lead is used for the precipitant reagent, or the solution may be left acidic, in which case a compound of lead may be used whose anion, upon reaction with the acid material, decomposes to form nothing more than water and volatiles. Lead carbonate is admirably suited for this purpose because of the economy due to its low solubility in water.

When the volatile organic acids originally present in the lignocellulose material, such as acetic, have not been removed, the acidic type treatment is preferred, as in that case the acetic, formic and other acids present in the solution may be used as a reactant with a lead compound such as the carbonate to effect precipitation of the PS-1-$a$ product without contaminating the solution with any inorganic anion content. On the other hand, if the volatile organic acids have been removed, it is preferred to completely neutralize the PS-1 solution and employ a soluble organic salt of lead such as the acetate for the precipitation of the PS-1-$a$ component, as in this way more complete freedom from contamination of the solution with inorganic salts can be obtained.

Referring to the drawing which is generic to both procedures, the process will now be generally described in terms of the treatment when acetic acid is present in the solution, which treatment is a preferred embodiment of the invention. The first procedural objective which is the removal of the salt content may also follow two different procedural courses, or a combination of the two, as represented by steps 42 and 45, the alternative procedural sequences being designated by the letters H and J respectively. If sulfuric acid has been previously used in the process, or some other acid whose anion can be thus readily precipitated, the solution is treated by sequence H at step 42 with an alkaline earth metal compound soluble in acid to effect precipitation of the sulfate ion. Preferred compounds are calcium carbonate or calcium hydroxide (lime).

A sufficient amount of the alkaline earth metal compound is added to precipitate the sulphate ion content attributable to free sulfuric acid in the solution, as alkaline earth metal sulphate. In practice, lime or calcium carbonate are added to bring the solution to a pH of from 2.0 to 3.5. The addition is stopped at this point in order not to react with the acetic and the other acids present which occur naturally in the wood. It will thereby be seen that the reaction is controlled so as to neutralize the sulfuric acid while maintaining the acetic acid content of the solution in the free state. The chemical reaction is illustrated by the following equation:

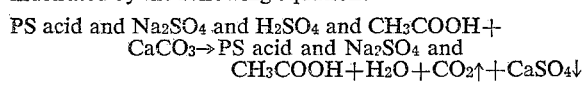

$$\text{PS acid and Na}_2\text{SO}_4 \text{ and H}_2\text{SO}_4 \text{ and CH}_3\text{COOH} + \\ \text{CaCO}_3 \rightarrow \text{PS acid and Na}_2\text{SO}_4 \text{ and} \\ \text{CH}_3\text{COOH} + \text{H}_2\text{O} + \text{CO}_2\uparrow + \text{CaSO}_4\downarrow$$

The precipitant employed in step 42 may be any alkaline earth metal compound soluble in acid having a solubility product less than that of the alkaline metal sulfate, assuming sulfuric acid has been employed for the precipitation of lignin. However, when compounds are used, other than oxides, carbonates, hydroxides, or other compounds whose anions decompose in acid solution to form water and volatiles, the ensuing procedure may be somewhat altered. For instance, calcium chloride has been successfully used, but in this case the pH value remained substantially the same as present in the solution at the beginning of the treatment, viz., about 1.5. The use of the chloride salt, as well as any inorganic salt whose anion is not decomposed in acid solution to water and volatiles, has the disadvantage that it increases the inorganic salt content of the solution and, therefore, poses the greater likelihood of contamination of the organic products sought and the problem of its subsequent removal. On the other hand, alkaline earth metal organic salts, such as the acetates or formates, may be conveniently employed where the recovery of the corresponding organic acid (acetic in the case of acetates) is contemplated as a subsequent step in the process. The solution is then filtered at step 43 to recover the alkaline earth metal salt (calcium sulfate) as product 44, sometimes referred to as a lime cake, and the filtrate solution 48. The latter solution contains the desired acetic acid together with the organic materials being treated for recovery.

In the event an acid has been employed other than sulfuric in the steps of the process prior to the production of the raw PS-1 stock, 41, whose anion can be appropriately precipitated by a suitable reagent, step 42 may be practiced using such reagent.

In the event the acid employed in steps of the process prior to the production of raw PS-1 stock, 41, cannot be precipitated by the addition of a suitable reagent as at step 42, the solution is treated by the alternative method indicated at step 45 in accordance with procedural sequence J. The inorganic salt content may be substantially removed, as indicated by steps 45 and 46, by the employment of a concentration by evaporation procedure or a "freezing out" technique, designated in the drawing by the word "cool," whereby the salts are caused to crystalize out of the solution and may then be removed by filtration, or a combination of both techniques may be employed. These two techniques are represented together in procedural step 45 of the drawing. By "freezing out" is meant the lowering of the temperature of the solution to a value at which the inorganic salt content becomes relatively insoluble, thereby causing it to crystallize from solution. The salts which thus crystallize out are filtered at step 46 and recovered as a salt cake 47 leaving filtrate 48 as a syrup consisting of a substantially pure PS-1 product.

As indicated in the drawing, the filtrate from step 43, after treatment with an alkaline earth metal compound in step 42, may also be subjected by sequence K to the concentration or freezing out technique of step 45. This procedure is desirable where maximum purity of product PS-1 is desired inasmuch as some sodium sulfate will remain in solution after treatment with the alkaline earth metal compound, and other inorganic salts are also likely to be present. The additional treatment of sequence K is also very desirable when an alkaline earth compound has been employed at step 42 which leaves a salt-forming anion in solution, such as calcium chloride. It is also to be understood that steps 45 and 46 may be advantageously practiced before steps 42 and 43, as, for instance, for the purpose of reducing the quantitative requirement of the sulfate precipitant.

Product 48, consisting of the substantially pure PS-1 material in syrup form, may be used as is for purposes to which it is adapted, or it may be obtained in solid form by evaporating to dryness. In the event the process is to conclude with the production of the composite product, PS-1, it may be desirable at this point to remove therefrom the volatile organic acid content by steam distillation.

In the continuation of the full process for the separation of the PS-1 material into its two components, the phenolic component of the said organic materials is next isolated by treating solution 48 at step 49 with an excess of a compound effective to produce lead ions in solution. As previously noted, lead is the only metallic ion or radical which reacts with any part of the organic materials to form insoluble organic salts in aqueous solutions. Either a soluble compound of lead, such as lead acetate or insoluble compounds of lead which are soluble in the acid solution, such as lead hydroxide or lead carbonate may be used. It is preferred to use compounds whose anions decompose in acid solution to produce only water or water and volatile materials. Compounds whose anions would form contaminating salts are to be avoided. In this embodiment of the process wherein acetic acid is present in free acid state, lead carbonate is advantageously used in order to employ the regenerative effect of the acetic acid. The process will be further described herein with reference to the use of lead carbonate which reacts (1) with the acetic acid to form lead acetate, which in turn reacts (2) with the phenolic part of the organic materials to form the insoluble lead salt thereof. Any frothing which may occur due to the evolving of carbon dioxide is readily remedied by the addition of a small amount of water. The chemical reactions involved are illustrated by the following equations:

(1) $2CH_3COOH + PbCO_3 \rightarrow (CH_3COO)_2Pb + H_2O + CO_2\uparrow$

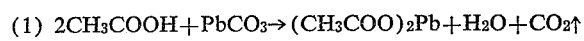

(2) PS acid and $NaPS + (CH_3COO)_2Pb \rightarrow$
Pb PS-1-a$\downarrow$ + $CH_3COOH$ + $CH_3COONa$ +
PS-1-b acid and Na PS-1-b It is interesting in connection with this process that when the lead acetate reacts by Reaction 2 with the polyphenolic product contained in solution, to form its insoluble lead salt, acetic acid is regenerated. This is again converted to lead acetate by Reaction 1 which in turn converts more PS-1-a to the insoluble lead salt by Reaction 2, and acetic acid is again regenerated. This cycle is repeated until substantially quantitative conversion of PS-1-a to the insoluble lead salt is obtained. When the reaction of lead acetate with the PS-1-a, Reaction 2, is completed and all the PS-1-a has been precipitated as the insoluble lead salt, Reaction 1 proceeds between the excess lead carbonate and acetic acid to final conclusion with the formation of lead acetate. It is apparent from the above discussion that the small quantity of acetic acid originally present in the source material is sufficient to convert the entire content of PS-1-a to the insoluble lead salt which is separated from the solution by filtration at step 50 and obtained as the residue 51.

The filtrate 52 obtained from the filtration step 50 contains the soluble lead salts of diverse organic materials other than cellulose or lignin, product PS-1-b, and lead acetate. It is treated at step 53 with an alkali metal inorganic compound with whose anion the lead reacts to form an insoluble compound, for instance, sodium carbonate, to effect the precipitation of the lead as lead carbonate, which material is recovered as product 55 by filtration at step 54. In commercial practice, soda ash is the preferred reagent for the lead carbonate precipitant. The filtrate 56 contains primarily the alkali metal salts of the group of compounds designated as product PS-1-b—in this case sodium PS-1-b—and also contains sodium acetate as the reaction product of the sodium carbonate and lead acetate. The acetic and any other volatile organic acids present in salt form may be recovered as product 37″, if desired, by acidification of solution 56 with a substantially non-volatile mineral acid such as sulfuric, at step 57, followed by steam distillation as indicated at step 58.

With or without the removal of the volatile organic acids, the alkali metal salts of the PS-1-b material may be converted to acid form, if desired, by acidification with a mineral acid, such as sulfuric, at step 57 and the substantially pure acid product may be obtained by the concentration or "freezing out" technique hereinbefore described which causes the separation by crystallization of the alkali metal salts as well as any other inorganic salts which may be present at this stage of the process. The thus separated inorganic salts are filtered at step 60 and obtained as salt cake 61, leaving the syrupy PS-1-b acid, 62.

The PS-1-b product may be applied directly in solution form, either as the alkali metal salts, product 56, obtained from step 54 or as the acid material 62, obtained from step 60, to the various purposes for which it has been found useful, where it is convenient to do so, or either product 56 or 62 may be evaporated to dryness to obtain the same in solid form where so dictated by considerations of storage and shipping problems, or for uses in which the solid material is preferred. Evaporation of the acid material 62 should preferably be done in vacuo.

The lead PS-1-a product 51 is advantageously converted to the alkali metal salt of PS-1-a, in which form it is more usable, by treatment with an alkaline reacting compound of an alkali metal whose anion forms an insoluble compound with lead, as indicated at step 63. The alkali metal hydroxides and carbonates are satisfactory for this purpose. Soda ash is a preferred reagent. The process as described herein is illustrated by the use of sodium carbonate for the treatment at this step. As pointed out in the discussion of step 49, an excess of lead carbonate was originally employed, so this excess, being insoluble, is contained in product 51. It is economically desirable to recover both the excess lead carbonate and the lead carbonate reconverted from the lead PS-1-a for reuse in the practice of step 49. The treatment is conducted by dispersing the lead PS-1-a in a solution of an alkaline reacting compound of an alkali metal whose anion forms an insoluble compound with lead, for instance sodium carbonate, whereupon the lead salt of PS-1-a and other salts of lead are converted to soluble sodium salts. In the event the sulfate ion had not been completely removed at step 42, as is probably the case, insoluble lead sulfate will have been precipitated at step 49 and recovered with the precipitated lead PS-1-a as an additional contaminating substance. The sodium carbonate treatment at step 63, serves to purify the PS-1-a product of the contaminating lead sulfate and at the same time to recover the lead content of the PS-1-a lead salt for reuse in step 49. The sodium carbonate has a solubilizing effect on the insoluble lead PS-1-a and lead sulfate. The lead ions temporarily go into solution and then are reprecipitated inasmuch as lead carbonate is still more insoluble than the first-mentioned two products.

Dissolving of the lead PS-1-a and lead sulfate and reprecipitation of the lead as lead carbonate is explained by the differences in solubility products of the different chemicals involved in the reaction. The chemical reactions involved are as follows:

Pb PS-1-a+Na2CO3→Na PS-1-a+PbCO3↓

PbSO4+Na2CO3→Na2SO4+PbCO3↓

The suspension is filtered at step 64 to recover the lead carbonate precipitate 55' and to obtain the alkali metal salt of PS-1-a in the filtrate 65. It will be observed from the drawing that products 55' and 55 are shown by a common diagrammatic representation which indicates not only the common identity of substances but also that the products are advantageously combined for reuse in step 49.

The filtrate 65 containing the soluble alkali metal salt of PS-1-a, together with any sodium sulfate present, may be applied as is for uses for which it is satisfactory in this form. It may be purified by removing the sodium sulfate by concentration or "freezing out" techniques or a combination, as by partially evaporating, cooling and filtering off the salt thereby crystallized from solution. It may then be evaporated to dryness, if desired. Alternatively, filtrate 65 may be processed to convert the alkali metal salt of PS-1-a to acid form in the same manner as described for the similar processing of PS-1-b product 56 by means of steps 57, 59 and 60, and the PS-1-a acid may be recovered in solid form by evaporation in vacuo.

While the process of the invention has been described with reference to the inclusion of the step of removal of the inorganic salt content in order to obtain a purified PS-1 product and the consequent treatment of such purified product for separation into products PS-1-a and PS-1-b, it is to be observed that when the obtaining of the PS-1 product in substantially pure form is not a consideration, the raw PS-1 stock solution 41 may be treated directly at step 49 by sequence L for the precipitation of PS-1-a as the lead salt. The purity of the precipitate will depend largely on the extent to which inorganic anions were present which form insoluble salts with lead. If such are present, the precipitated PS-1-a product may be purified, if desired, by treatment with sodium carbonate in the manner hereinbefore described at step 63 in connection with the removal of lead sulfate from product 51. This direct treatment of solution 41 to precipitate lead PS-1-a is advantageous for modifications of the process where purification of product 51 is no problem, or where primary interest is in recovery of product PS-1-b.

A specific embodiment of the invention will now be described, which is particularly applicable when the volatile organic acids, such as acetic and formic, have been removed at an earlier stage in the process of producing the raw PS-1 stock, and when sulfuric acid has been used to precipitate the lignin content. The acid solution 41 containing the raw PS-1 stock is first neutralized by addition, at step 42, of an alkaline earth metal compound such as lime or calcium carbonate. The precipitated calcium sulfate (lime cake) 44, is removed by filtration at step 43. The solution is then concentrated, by evaporation, thereby causing the separation by crystallization of the relatively more insoluble inorganic salts, and particularly any sulfates remaining which were not completely precipitated as calcium sulfate in step 42. The crystallized salt is then removed by filtration at step 46 to yield salt cake 47 and leave filtrate 48 as a syrup consisting of a substantially pure PS-1 product. This product may be used in this syrupy form, or it may be obtained in solid form by evaporating to dryness.

If it is desired to separate the syrupy solution into the two component products hereinbefore identified as PS-1-a and PS-1-b, a soluble lead compound such as lead acetate is added to the solution and thereby precipitates the PS-1-a component as insoluble lead salt. The insoluble lead PS-1-a may then be filtered at step 50 and treated as indicated at step 63 and described hereinbefore to recover the same as the alkali metal salt of PS-1-a, or the treatment may be carried still further to recover the product in its free acid form. The solution containing the PS-1-b product may be treated in the manner hereinbefore described for solution 52 to likewise recover the alkali metal salt of PS-1-b or the acid form of this product.

The relationship of the novel products of this invention to the lignocellulose raw material from which they are derived is illustrated by the percentage analysis of four different lignocellulose samples which are treated in accordance with the process of application Serial No. 33,278, supra, to provide fiber, lignin and volatile acid products. The solution remaining, containing the other organic materials and corresponding to PS-1 raw stock represented at 41 in the drawing of this application, was processed as described herein as when the volatile acids have been removed, to produce the PS-1-a and PS-1-b products of this invention. The four samples of lignocellulose material were fibers prepared from aspen wood by the McMillan and Asplund processes and from Jack pine wood by the same two processes. The total percentage analysis of the samples are shown in Table I below, wherein the "other organics" are reported as one product. In Table II, the "other organics" are broken down into the relative percentages of PS-1-a and PS-1-b, and the volatile acids are also recapitulated and the percentages of all three products totaled. Percentages in both Tables I and II are reported in terms of the original dry fiber in order to preserve the relationship of each product to the original raw material. It will be understood, that when the volatile acids have not been separately removed they will be recovered in the form of their sodium salts along with product PS-1-b.

TABLE I

*Yields of products*

[Expressed in percent weight of original dry fiber.]

| Fiber | McMillan Aspen | Asplund Aspen | McMillan Jack pine | Asplund Jack pine |
|---|---|---|---|---|
| Product: | | | | |
| Extracted fiber | 81.3 | 79.6 | 84.1 | 78.9 |
| Total organics extracted | 18.7 | 20.4 | 15.9 | 21.1 |
| Total liquors | 5.5 | 6.1 | 3.5 | 6.5 |
| Volatile acids | 5.8 | 5.9 | 2.9 | 4.4 |
| Total other organics | 5.1 | 6.8 | 6.7 | 7.1 |
| | 16.4 | 18.8 | 13.1 | 18.0 |
| Remainder unaccounted for | 2.3 | 1.6 | 2.8 | 3.1 |

TABLE II

| Other Organics: | | | | |
|---|---|---|---|---|
| PS-1-a | 1.2 | 2.4 | 2.0 | 2.8 |
| PS-1-b | 3.9 | 4.4 | 4.7 | 4.3 |
| Total | 5.1 | 6.8 | 6.7 | 7.1 |
| Volatile Acids | 5.8 | 5.9 | 2.9 | 4.4 |
| Total | 10.9 | 12.7 | 9.6 | 11.5 |

It will be observed that the realtive ratio of yield of the different products varies somewhat with different raw materials, but as an average, the yield of PS-1-b, exclusive of the volatile acid salts, is about twice that of the PS-1-a product, and when the volatile acid salts are included in the PS-1-b product, the yield of the latter is considerably larger than the PS-1-a.

A large number of extensive tests have been conducted in an attempt to determine the chemical constitution and evaluate the properties of the novel products, PS-1, PS-1-a and PS-1-b.

The PS-1 product is obtained as a light brown powder. It is hygroscopic, easily soluble in water and partly soluble in organic solvents. It has a softening point in the range from 80 to 100° C. The aqueous solution may be fermented or otherwise treated to form valuable products, as by chemical reaction, and by hydrogenolysis to form glycerol and related products. It may be utilized for the preparation of organic chemical compounds as by controlled oxidation processes.

The product herein designated as PS-1-a is characterized by the following properties: It is a very dark-colored non-hygroscopic powder having a softening point range of 115 to 125° C., which was determined by dropping a sample upon a regulated hot plate at various temperatures and observing the temperature at which the sample melts. It is soluble in water. The pH of a 1% aqueous solution is about 2.3. It is soluble in glacial acetic acid and in methanol, ethanol, butanol or acetone when acid is present with those solvents, but is insoluble in benzene. It reduces hot Fehling's solution. It does not give a positive diazo reaction. It gives a reddish color reaction with bromine water. It apparently does not contain simple phenols and may, therefore, be regarded as a polyphenolic material; it resembles pyrogallol insofar as it can be reduced by means of zinc and hydrochloric acid in aqueous solution to an almost colorless material which upon exposure to air rapidly assumes a dark brown coloration caused by oxidation. It is not a lignin material as evidenced by the fact that the purified PS–1–a does not give a precipitate upon treatment with 72% sulfuric acid. Electrotitration data indicate the product is a monobasic acid. Only its lead salt is insoluble in aqueous solutions which indicates its use as a selective precipitant for the lead ion. It is capable of tanning leathers and has use as a dye in compositions such as inks. It also has qualities which make it useful as an adhesive.

The product herein designated, PS–1–b, is a light cream colored powder giving positive carbohydrate tests, being composed largely of salts of aliphatic hydroxy carboxylic acids and formic and acetic acids unless the volatile organic acids have been removed at an earlier step in the process. Under the processing conditions outlined in this application, the soda salts of these acids obtained as PS–1–b have no definite melting or softening points but char at about 290° C. The PS–1–b product has an ash content varying from about 25 to 35%. It is infinitely soluble in water, partly insoluble in methanol, ethanol, butanol and acetone, and is insoluble in glacial acetic acid and benzene. A 1% aqueous solution has a pH of about 10. Electrotitration curves suggest the presence of weak acids of different strengths. It has no reducing action on hot Fehling's solution. All metal salts are soluble. It gives no color reaction with bromine water and only a slight reaction with ferric chloride. The product is hygroscopic, thus adapting itself for use as a plasticizer in the manufacture of glassine paper. It has been found useful as a crystallization modifier in aqueous solutions of organic compounds such as sugars, or of inorganic salts such as potassium bromide. It can be acetylated, and the acetate can be used to formulate lacquers.

It will be readily understood by those skilled in the art that various modifications and alternative procedures may be devised for the practice of the foregoing described invention. All such procedures, techniques, substitute reagents and variations as will readily occur to those skilled in the art are to be regarded as equivalents and included within the scope of the corresponding procedure, technique, reagent and variant as defined in the following appended claims.

What is claimed is:

1. The process for the treatment of a solution obtained from the treatment of lignocellulose material originally containing lignin, cellulose, non-ligneous phenolic substances, and formic, acetic and hydroxyl acids ranging in size from blycolic to low molecular weight polysaccharide acids, which comprises acidifying said solution to a pH value of approximately 1.5 to precipitate substantially all of its lignin content, removing said precipitate from said solution, introducing lead ions into said residual solution to precipitate as insoluble salts of lead the non-ligneous phenolic substances in said solution, and separating said lead organic salts from said solution.

2. The process for the treatment of a residual solution obtained from the treatment of lignocellulose material and from which the lignin and cellulose have been removed, which solution contains non-ligneous phenolic substances and formic, acetic and hydroxyl acids ranging in size from blycolic to low molecular polysaccharide acids, said process comprising adding a precipitant other than a lead compound for inorganic anions contained in said solution, separating the inorganic salts thereby precipitated, introducing lead ions into said solution to precipitate as insoluble salts of lead said non-ligneous phenolic substances in said solution, and separating said lead organic salts from said solution.

3. The process for the treatment of a residual solution obtained by the treatment of wood to remove the lignin and cellulose therefrom, which comprises treating said solution with an alkaline earth metal compound which is soluble therein to remove from said solution by precipitation insoluble alkaline earth metal salts of acid radicals present in said solution which form insoluble salts with an alkaline earth metal, separating said precipitated salts, introducing lead ions into the solution obtained from said separation to thereby precipitate as insoluble salts of lead one group of organic compounds in said solution consisting of non-ligneous phenolic substances, and separating said lead organic salts from said solution.

4. The process for the treatment of a residual solution obtained by the treatment of lignocellulose material originally containing lignin, cellulose, non-ligneous phenolic substances, and formic, acetic and hydroxyl acids ranging in size from glycolic to low molecular polysaccharide acids and from which solution the cellulose and lignin have been removed, which comprises lowering the temperature of said solution to crystallize a substantial portion of the inorganic salt content thereof, separating said crystallized inorganic salts, introducing lead ions into the solution obtained from said separation to precipitate as insoluble salts of lead said non-ligneous phenolic substances in said solution, and separating said lead organic salts from said solution.

5. The process for the treatment of a residual solution obtained by the treatment of wood to remove the lignin and cellulose therefrom, which comprises treating said solution with an alkaline earth metal compound which is soluble therein to remove from said solution by precipitation insoluble alkaline earth metal salts of acid radicals present in said solution which form insoluble salts with an alkaline earth metal, separating said precipitated salts, concentrating said solution to crystallize a substantial portion of the inorganic salt content thereof, separating said crystallized inorganic salts, introducing lead ions into the solution obtained from said separation to precipitate as insoluble salts of lead one group of organic compounds in said solution consisting of non-ligneous phenolic substances, and separating said lead organic salts from said solution.

6. The process for the treatment of a residual solution obtained by the treatment of wood to remove the lignin and cellulose therefrom, which comprises concentrating and cooling said solution to crystallize a substantial portion of the inorganic salt content thereof, separating said crystallized inorganic salts, adding to the solution from which the inorganic salts are removed a lead compound soluble in said solution to precipitate as insoluble salts of lead one group of organic compounds in said solution consisting of non-ligneous phenolic substances, and separating said lead organic salts from said solution.

7. The process as defined in claim 1, together with the additional steps of adding the precipitate of lead organic salts thus obtained to a sodium carbonate solution to react metathetically with said lead organic salts and any insoluble lead inorganic salts present in said precipitate to form lead carbonate as a precipitate, and separating the precipitated lead carbonate to obtain a solution of the alkali metal salts of said organic compounds which were precipitated by lead.

8. The process as defined in claim 1, together with the additional steps of adding the precipitate of lead organic salts thus obtained to a solution of sodium carbonate to react metathetically with said lead organic salts and any insoluble lead inorganic salts present in said precitate to form lead carbonate as a precipitate, separating said lead carbonate precipitate to obtain a solution of the alkali metal salts of said organic compounds which were precipitated by lead, acidifying said solution to a pH of approximately 1.5, concentrating and cooling said solution to remove the inorganic salt content thereof, thereby to obtain in acid form a solution of said organic compounds which were precipitated by lead, and evaporating said final solution to obtain said acid organic compounds in solid form.

9. The process as defined in claim 1, together with the additional step of treating the solution remaining after the separation of said lead organic salts to remove the lead ion content therefrom by reacting said solution with sodium carbonate to precipitate the lead therefrom as lead carbonate, and separating said lead carbonate to obtain a solution consisting primarily of the sodium salts of the organic materials remaining in solution.

10. The process of treating the residual solution resulting from the sulfuric acid precipitation of lignin products from a solution obtained by the delignification treatment of wood which comprises, treating said residual solution with an alkaline earth metal compound soluble in said residual solution to precipitate the sulfate radical from said residual solution as the alkaline earth metal sulfate, separating the thus precipitated alkaline earth metal sulfate from said solution, introducing into the solution resulting from said separation lead ions to precipitate as insoluble lead salts one group of organic compounds in said solution consisting of non-ligneous phenolic substances, and separating said lead organic salts from said solution.

11. The process for the treatment of an acid solution containing non-ligneous phenolic substances and formic, acetic and hydroxyl acids ranging in size from glycolic to low molecular polysaccharide acids, said solution being obtained from the treatment of lignocellulose material whereby the lignin and cellulose have been removed, for the recovery from said solution of said non-ligneous phenolic substances, which process comprises adding an alkaline reacting compound to establish a pH value for said solution of approximately 2 to 4, adding lead carbonate to said solution to precipitate as insoluble salts of lead said non-ligneous phenolic substances in said solution, and separating said lead organic salts from said solution.

12. A process for the treatment of a solution obtained from the treatment of wood whereby the lignin and cellulose have been removed, the lignin having been precipitated from said solution with sulfuric acid, for the recovery from said solution of organic materials, which comprises treating said solution with an alkaline earth metal compound soluble therein to precipitate as alkaline earth metal sulfate the sulfate radical content of said solution attributable to free sulfuric acid, separating the thus precipitated alkaline earth metal sulfate from the solution, thereafter adding lead carbonate to said solution to precipitate as insoluble salts of lead one group of organic compounds in said solution consisting of non-ligneous phenolic substances, and separating said lead organic salts from said solution.

13. The process for the treatment of an acid solution obtained from the treatment of lignocellulose material originally containing, in addition to lignin and cellulose, other organic materials including a phenolic component and acetic acid and from which solution the lignin and cellulose have been removed, for the recovery from said solution of said phenolic component, which comprises adding an alkaline reacting compound to said solution to establish a pH value of approximately 2 to 4, thereafter treating the solution with a compound of lead whose anion decomposes therein to form water whereby lead acetate is formed by reaction with said lead compound and the acetic acid content of the solution, said lead acetate metathetically reacting with the phenolic component of said organic materials to form insoluble lead salts thereof, thereby regenerating acetic acid for further reaction with said lead compound, said regenerative reaction continuing until substantially quantitative recovery of the phenolic component has been obtained, and separating the precipitated lead salt of said phenolic material to recover same as one product.

14. The process for the treatment of a solution obtained from the treatment of lignocellulose material originally containing in addition to lignin and cellulose other organic materials including a phenolic component and acetic acid and from which solution the lignin and cellulose have been removed, the lignins having been precipitated with sulfuric acid, for the recovery from said solution of said phenolic component, which comprises treating said solution with an alkaline earth metal compound soluble therein to precipitate as alkaline earth metal sulfate the sulfate radical content of said solution attributable to free sulfuric acid, separating the thus precipitated alkaline earth metal sulfate from the solution, treating the remaining solution with a compound of lead whose anion decomposes therein to form water whereby lead acetate is formed by reaction with said lead compound and the acetic acid content of the solution, said lead acetate metathetically reacting with the phenolic component of said organic materials to form insoluble lead salts thereof, thereby regenerating acetic acid for further reaction with said lead compound, said regenerative reaction continuing until substantially quantitative recovery of the phenolic component has been obtained, and separating the precipitated lead salt of said phenolic material to recover same as one product.

15. As a new composition of matter the alkali metal salts of the non-ligneous phenolic substances produced in the process of claim 7.

16. As a new composition of matter the sodium salts of the organic materials remaining in the solution produced in the process of claim 9.

References Cited in the file of this patent

UNITED STATES PATENTS

| 2,022,482 | Stewart | Nov. 26, 1935 |
| 2,325,542 | Pritchard et al. | July 27, 1943 |

FOREIGN PATENTS

| 19,600 | Great Britain | of 1912 |
| 565,645 | France | Jan. 31, 1924 |

OTHER REFERENCES

Walker: J. Soc. Chem. Ind. 32 (1913), p. 389.
Holzer: Tech. Assoc. Papers, Sec. XVIII, 1935, page 520, 1 p.